(12) United States Patent
Schwagerle et al.

(10) Patent No.: US 10,343,222 B2
(45) Date of Patent: Jul. 9, 2019

(54) PARTING BLADE AND GROOVING AND PARTING-OFF TOOL

(71) Applicant: WALTER AG, Tubingen (DE)

(72) Inventors: Rainer Schwagerle, Tubingen (DE); Rudi Zeeb, Tubingen (DE)

(73) Assignee: WALTER AG, Tubingen (DE)

( * ) Notice: Subject to any disclaimer, the term of this patent is extended or adjusted under 35 U.S.C. 154(b) by 46 days.

(21) Appl. No.: 15/527,337

(22) PCT Filed: Oct. 20, 2015

(86) PCT No.: PCT/EP2015/074278
§ 371 (c)(1),
(2) Date: May 17, 2017

(87) PCT Pub. No.: WO2016/078856
PCT Pub. Date: May 26, 2016

(65) Prior Publication Data
US 2017/0326650 A1    Nov. 16, 2017

(30) Foreign Application Priority Data
Nov. 18, 2014   (EP) .................................... 14193657

(51) Int. Cl.
*B23B 27/04*     (2006.01)
*B23B 27/10*     (2006.01)
(Continued)

(52) U.S. Cl.
CPC .............. *B23B 27/10* (2013.01); *B23B 27/08* (2013.01); *B23B 27/086* (2013.01);
(Continued)

(58) Field of Classification Search
CPC ..... B23B 27/08; B23B 27/086; B23B 29/043; B23B 2250/12; B23B 27/10
See application file for complete search history.

(56) References Cited

U.S. PATENT DOCUMENTS

2013/0078043 A1*   3/2013   Henry ..................... B23B 27/10
                                                                407/11
2013/0236253 A1*   9/2013   Malka ................... B23B 27/086
                                                                407/11

FOREIGN PATENT DOCUMENTS

DE         8126791 U1     3/1983
EP         2745963 A1     6/2014
(Continued)

*Primary Examiner* — Alan Snyder
(74) *Attorney, Agent, or Firm* — Corinne R. Gorski (57) ABSTRACT

A parting blade includes an internal cooling agent supply and has two substantially plane-parallel lateral faces and a continuous transversal bore connected to a cooling agent channel that runs parallel to the lateral faces in the interior of the parting blade. In order to provide a parting blade that has no projection on one side, a stopper is provided having two substantially parallel end faces and a circumferential face that connects the end faces. The stopper can be inserted into the transversal bore of the parting blade, thereby sealing the transversal bore relative to at least one lateral face of the parting blade. The stopper terminates without protruding over the sealed lateral face, flush with the lateral face. The stopper has an opening on both the end face and the circumferential face. The openings are connected to one another in the interior of the stopper to connect the cooling agent channel to a cooling agent source.

9 Claims, 7 Drawing Sheets

(51) Int. Cl.
*B23B 27/08* (2006.01)
*B23B 29/04* (2006.01)
(52) U.S. Cl.
CPC .... *B23B 29/043* (2013.01); *B23B 2200/3627* (2013.01); *B23B 2205/02* (2013.01); *B23B 2250/12* (2013.01); *B23B 2260/126* (2013.01)

(56) References Cited

FOREIGN PATENT DOCUMENTS

| WO | 2005084947 A1 | 9/2005 |
| WO | 2013132480 A1 | 9/2013 |
| WO | 2014095545 A1 | 6/2014 |

\* cited by examiner

PARTING BLADE AND GROOVING AND PARTING-OFF TOOL

RELATED APPLICATION DATA

This application is a § 371 National Stage application of PCT International Application No. PCT/EP2015/074278 filed Oct. 20, 2015 claiming priority of EP_ Application No. 14193657.5, filed Nov. 18, 2014.

TECHNICAL FIELD

The present disclosure relates to a parting blade with an internal coolant supply, wherein the parting blade has two essentially plane-parallel side faces and a continuous transverse bore which is connected with a coolant channel running in the interior of the parting blade parallel to the side faces.

The present disclosure also relates to a tool for grooving or parting off with a corresponding parting blade and a parting blade holder which has a flat side bearing face for the bearing of a side face of the parting blade and at least one clamping face which is angled in relation to the bearing face for engagement with an edge face of the parting blade.

BACKGROUND

Corresponding parting blades and tools are known in the prior art, for example from WO 2013/132480 A1, wherein the internal coolant channel which runs in the interior of the parting blade parallel to the sides, debouches in the vicinity of a cutting insert which is clamped at one or both ends of such a parting blade. Corresponding parting blades essentially comprise an elongated plate with two plane-parallel sides, an upper and a lower edge face and end faces, wherein receiving slots are provided for clamping of grooving and parting-off cutting inserts typically in the region of the end faces of the parting blade. The edge faces and the end faces run essentially transversely in relation to the parallel side faces and connect these with one another.

A cutting edge of such a cutting insert also running transversely in relation to the side faces of the parting blade is typically somewhat longer than the parting blade is thick (measured as the gap between the parallel side faces), so that when cutting a groove in a rotating workpiece the groove produced in the workpiece by the cutting edge is broader than the parting blade is thick so that the parting blade together with the cutting insert penetrate into the groove produced in the workpiece and so correspondingly deep grooves can be made or workpieces can be grooved with a correspondingly large diameter.

In the last decades the material of corresponding cutting inserts has been continuously developed so that the parting blades fitted with the cutting inserts have a high cutting performance and can cut grooves or part off workpieces correspondingly rapidly. In addition, the continuously developed materials and alloys of the workpieces often make higher and additional demands on the machining tools, in particular the cutting elements. However, use with workpieces which are difficult to cut and increased working speed and cut volume are inevitably associated with higher friction and increased heating of the cutting inserts. Overheating produces a very rapid decline in the performance and durability of the cutting elements or cutting inserts, leading to high wear and consumption of the costly cutting elements.

For this reason, corresponding parting blades which are designed to achieve high cutting performance with the associated cutting inserts are provided with integrated coolant supply systems which make it possible to deliver the coolant effectively to the cutting insert and to the vicinity of the cutting edge even during deep grooving or parting off, so that continuous effective cooling of the cutting insert can be carried out during the entire cutting operation.

For this reason, the coolant channels run in the interior of the parting blades which are already per se very narrow and typically have a thickness (i.e. a gap between their plane-parallel side faces) of less than 10 mm and often of only 3 to 6 mm.

Here, the supply of coolant to the internal coolant channel or the internal coolant channels is expediently best provided through a transverse bore which extends perpendicularly through the side faces and on one side is aligned with a corresponding transfer or delivery opening in the bearing face of a parting blade holder and on the opposite side is closed with the aid of caps or covers or screws since the opposite side of the parting blades to the bearing face is usually exposed and the clamping of the parting blades is normally effected solely using the upper and lower edge faces which for this purpose can have a roof-shaped or trapezoidal contour.

Such blanking covers or screws or corresponding clamping claws which close the side of the transverse bore in the parting blade remote from the delivery opening in the holder, necessarily protrude from the side face of the parting blade and can obstruct the stream of cuttings or the guiding movement of the parting blade past radial projections on a workpiece.

SUMMARY

In view of this prior art, to overcome the above disadvantages, the present disclosure is directed to creating a parting blade and a corresponding tool for grooving and parting off having an internal coolant supply and which has no protrusion of any kind on a side of the parting blade or on the side of the parting blade remote from the bearing face with a corresponding tool.

This objective is achieved in that a stopper is provided having two essentially parallel end faces and a circumferential face, which connects the end faces with one another. The stopper can be inserted into the transverse bore of a parting blade, in the process sealing the transverse bore on at least one side face of the parting blade, and terminating without any protrusion beyond the sealed side face, in particular flush with this side face, wherein the stopper has an opening in its opposite end face and an opening in its circumferential face. These openings are connected with one another in the interior of the stopper, through which the stopper connects the coolant channel which is open at the circumference of the transverse bore with a coolant source opposite the end face opening of the stopper.

Therefore, instead of a cover, a screw or the like, only a stopper is introduced into the transverse bore, this stopper after being inserted in the transverse bore having no protrusion of any kind whatsoever on the side face of the parting blade to be sealed and preferably terminating flush with this side face.

On the opposite side as well the stopper should have little or no protrusion because on this side the parting blade must lie flat on the generally flat bearing face of a parting blade holder.

However, as the parting blade holder has a delivery opening in the position concerned, it would also be possible in principle for the stopper to be allowed to protrude a small amount on the side of the parting blade facing the bearing face, however this is basically not necessary and therefore also not preferred.

In order to be able to fit the stopper in the transverse bore flush and free of any protrusion in a simple manner, in one form of embodiment provision is made for the stopper to have the basic shape of a cylinder one end side of which has a radially protruding flanged rim and a central opening.

When the parting blade is in use, this end side faces the bearing face of the parting blade holder so that the stopper has to be inserted from this side into the transverse bore of the parting blade which is embodied accordingly in the form of a stepped bore, the flanged rim being received in the widened portion of the stepped bore. For this, the depth of this widened portion of the stepped bore corresponds to the thickness of the flanged rim so that when the flanged rim is resting on the bottom of the widened portion of the stepped bore, it (the flanged rim) terminates with its outside approximately flush with the side face of the parting blade which bears on the bearing face of a parting blade holder. The diameter of the widened portion corresponds to the outside diameter of the flanged rim so that the flanged rim is preferably received in the widened portion of the transverse bore with a sliding fit.

The termination of the stopper or end side of the stopper with the flanged rim flush with the side face when the stopper is inserted completely has the advantage that a loosely clamped parting blade is displaceable in the longitudinal direction in the parting blade holder without a protruding stopper coming into contact with and fouling the rim of a delivery opening in the bearing face.

Apart from this, with the matching dimensions of the flanged rim, a stopper which is not completely inserted in the transverse bore with its end side still protruding a small amount from the side face of the parting blade is pressed completely into the transverse bore by the bearing face until the flanged rim or the end side concerned terminates flush with the side face and the internal face of the flanged rim bears on the bottom of the widened portion of the transverse bore when the parting blade is pressed against the bearing face of the parting blade holder.

When according to one variant of the invention the gap between the end sides of the stopper matches the thickness of the parting blade, the two end sides of the stopper can be flush with the respective side face of the parting blade.

For secure delivery of the coolant from the stopper into the coolant channel of the parting blade, it is expedient when the circumferential face of the stopper has a circumferential groove which ensures a connection between the opening on the circumferential face of the stopper and the opening of the coolant channel at the circumference of the transverse bore with any orientation of the stopper with respect to its axis. The opening in the circumferential face of the stopper is then located at the bottom of the circumferential groove so that even when the corresponding opening of the coolant channel lies in a different circumferential position to the opening in the circumferential face of the stopper, the connection between the two openings is established by means of the circumferential groove in the circumferential face of the stopper.

In the absence of such a groove, the stopper would always have to be inserted in the transverse bore in a particular fixed orientation so that the opening on the external circumference of the stopper lined up with the opening of the coolant channel on the internal face of the transverse bore. However, this variant is also possible in principle when markings or guiding elements are provided to guarantee the correct orientation of the stopper when it is inserted in the transverse bore.

For reliable sealing of the one side face of the parting blade with the stopper and the end side of the stopper terminating flush with this side, it is expedient when a circumferential seal groove is provided in the vicinity of this end side to be sealed in order to receive a sealing ring. For this, the depth of the seal groove is such that a sealing ring received in the seal groove projects beyond the circumferential face of the stopper bounding the seal groove so that the seal is compressed slightly between the bottom of the seal groove and the internal face of the transverse bore and thus has a sealing effect when the stopper is inserted in the transverse bore.

The openings of the stopper on its one end side and on its circumferential face are expediently connected with one another by a bore running obliquely in relation to the axis of the stopper. However, it is also possible in principle to provide a groove instead of a bore in the stopper, which groove starts from the circumferential edge of the stopper, which is formed by the end side with the flanged rim and the circumferential face of the stopper, and extends from there into the interior of the stopper, wherein the bottom of the groove also runs at an inclined angle to the axis of the stopper corresponding to the path of the bore which would have to be provided otherwise, and in this way produces a connection between the associated end side of the stopper which is partly open due to the groove and the circumferential face of the stopper which is also partly open through the groove so that effectively the coolant channel, which debouches in the circumferential face of the transverse bore, is also connected or can be connected with a corresponding opening in the bearing face of a parting blade holder.

As already mentioned, the transverse bore of the parting blade is preferably embodied in the form of a stepped bore, wherein the widened portion of the bore is designed to receive the flanged rim of the stopper.

Moreover, it also possible to form the transverse bore symmetrically with respect to a longitudinal median plane through the parting blade parallel to the two side faces, i.e. to provide a widened portion for receiving the flanged rim of the stopper at both ends of the transverse bore. The circumferential seal groove in the stopper for receiving the sealing ring would then have to be offset further inwards from the end side of the stopper for the seal to create the seal in the central portion of the transverse bore which has the smaller diameter. The stopper can then optionally be inserted from both sides of the parting blade, wherein on both sides a radial widening is provided at the ends of the transverse bore to receive the flanged rim and the sealing of the stopper is in each case effected further inwards in the transverse bore in the portion which is not widened.

With regard to the tool for parting off or grooving with a parting blade holder which has a flat side bearing face for the bearing of a side face of a parting blade and which has at least one clamping face which is angled in relation to the bearing face for engagement with an edge face of the parting blade, the underlying objective of the invention is achieved in that the tool is fitted with a parting blade according to one of claims 1 to 7 and the bearing face of the tool has a delivery opening which lies opposite the end side opening of the stopper when the parting blade is fitted in position ready for use.

For reliable sealing of the delivery opening in relation to the side face with the opening in the stopper, expediently a groove surrounding the delivery opening is provided in the bearing face of the tool to receive a sealing ring.

Here, the delivery opening in the bearing face of the parting blade holder can also take the form for example of a slot which comprises a corresponding seal groove and a seal arranged in it.

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

Figure 1A:
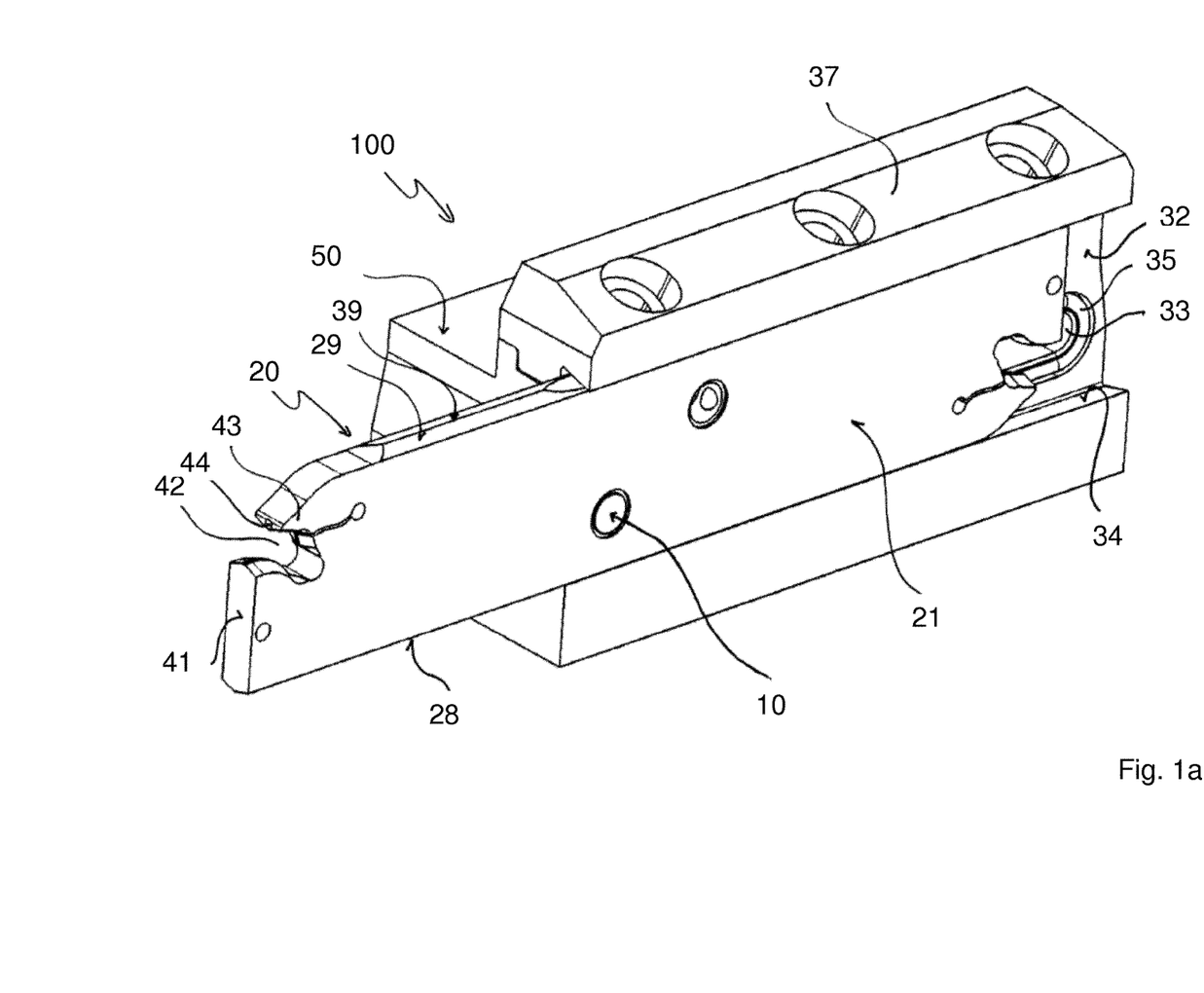
FIG. 1a shows a tool with a parting blade and a stopper according to the present disclosure.
Figure 1B:
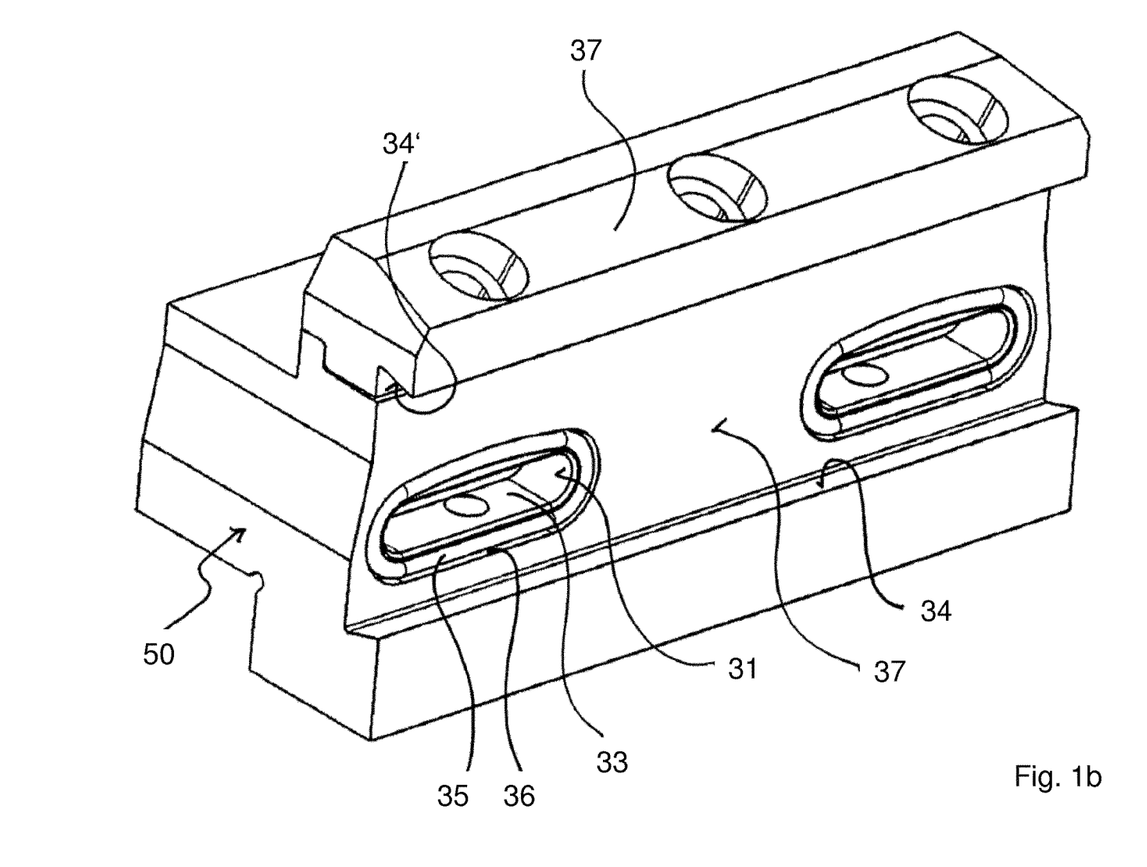
FIG. 1b shows a parting blade holder.
Figure 1C:
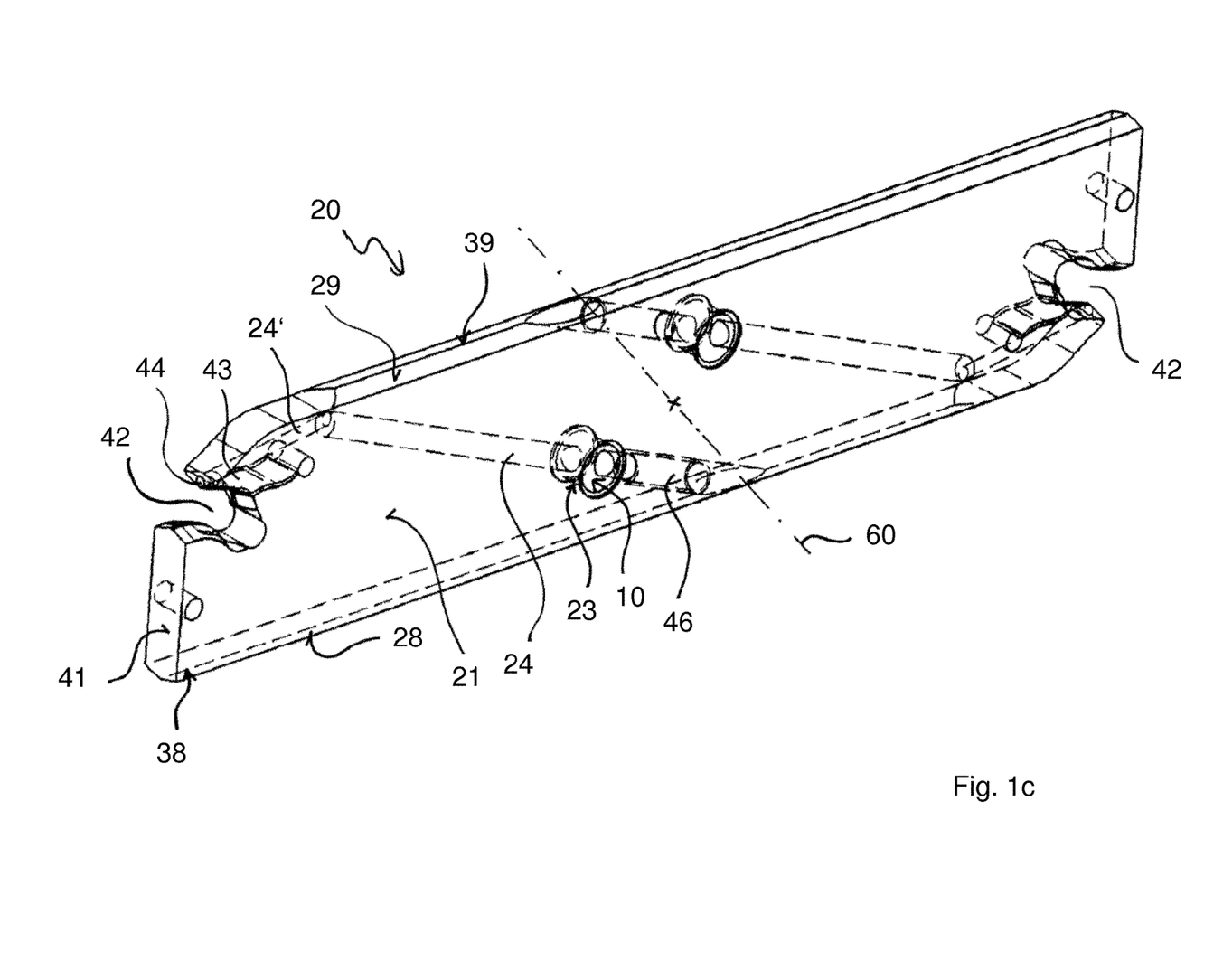
FIG. 1c shows a parting blade.

FIG. 1a shows a grooving and parting off tool designated over all with the reference number 100 with a parting blade holder 50 and a parting blade 20, which are shown separately in FIGS. 1b and 1c respectively. The parting blade holder has a bearing face 32, a clamping face 34 and a clamping block 37. The upper and lower edge faces 38 and 39 of the parting blade 20 have a roof-shaped profile, and the lower clamping face 34 and an upper clamping face 34' on the clamping block 37 have an inclination corresponding in each case to one side 28, 29 of the roof profile so that when the clamping block 37 is clamped firmly they engage with the roof faces 28, 29 of the edge faces 38 and 39 facing away from the bearing face 32 and thereby press the parting blade 20 with its side face 22 firmly against the bearing face 32.

In the exemplary embodiment according to FIG. 1b the bearing face 32 has two delivery openings 33, only one of which is active however, namely the one which is aligned with a stopper 10 and the corresponding transverse bore 23 of a parting blade 20.

Visible in the region of the end face 41 of the parting blade 20 (FIG. 1c) there is a receptacle 42 for a cutting insert (not shown) for grooving or parting off, wherein a portion of the parting blade 20 above this receiving slot 42 is embodied in the form of a springy movable clamping finger 43.

The parting blade is point symmetrical with respect to an axis of symmetry 60 which extends perpendicularly to the side faces 21, 22. In its interior the parting blade has coolant channels 24, 24' which run centrally and parallel to the side faces 21, 22, wherein the outlet channel 24' debouches in the clamping finger 43 of an outlet opening 44 debouching directly onto the cutting edge position of a cutting insert (not shown). The opposite end of the coolant channel 24, on the other side of the connection to the transverse bore, which is drilled into the parting blade 20 from the lower edge face 38, is closed and sealed by a blanking plug 46.

In operation, the delivery chamber 33 is pressurised with coolant and the coolant then flows through the delivery opening 31, sealed with a circumferential sealing ring 35, into the end face opening 2, the bore 4 of the stopper 10 and through the openings 3 and 26 and into the coolant channel 24 which debouches through the outlet channel 24' at the end of the clamping finger 43 into the outlet opening 44, from where a jet of coolant is aimed directly onto the region of the cutting edge of a cutting insert (not shown) clamped firmly in the receptacle 42.

Figure 2:
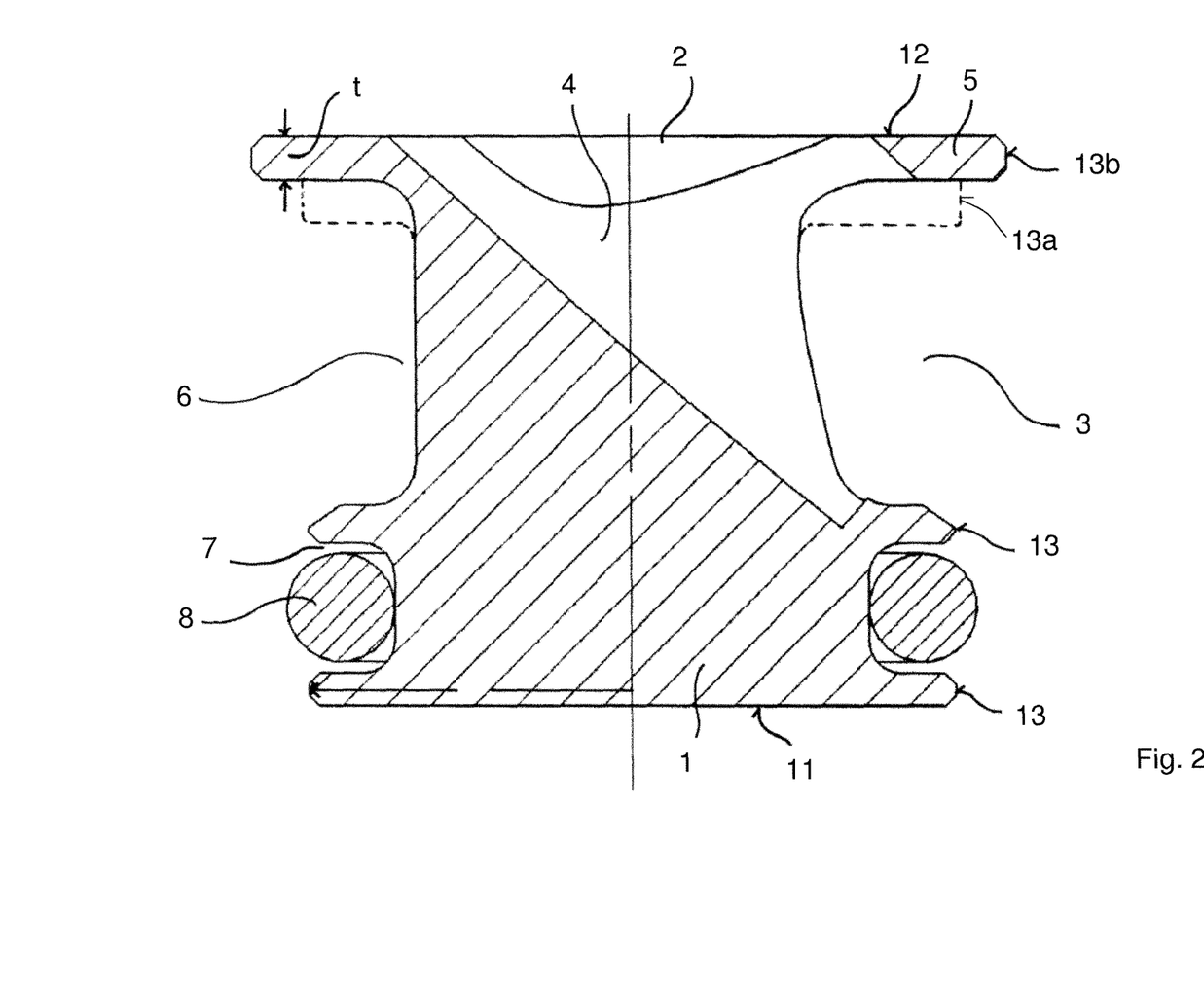
FIG. 2 shows a sectional view of the stopper.

FIG. 2 shows a section through the stopper according to the invention with an approximately cylindrical basic body 1 with the radius R, which in the orientation shown has a lower end side 11, an upper end side 12 and a circumferential face 13 which in the present case is multiply stepped and has a main radius R which corresponds to or is slightly less than the internal radius of the transverse bore 23.

The upper portion of the stopper 10 is widened with a circumferential flanged rim 5 and in a central axial region the stopper is provided with a circumferential distributor groove 6. A seal groove 7 is provided in the vicinity of the lower end side 11 running around and along the circumferential face 13. This seal groove 7 accommodates a sealing ring 8 which seals the stopper 10 in relation to the internal face of the transverse bore 23 as soon as the stopper has been inserted in the transverse bore. A bore 4 extends through the stopper at an oblique angle to its axis 9 from the end side 12 to the bottom of the groove 6 and so forms an end side opening 2 and a circumferential opening 3 of the stopper 10. The groove 6 extends as far as the flange 5. However, it can also be made narrower so that a stepped cylindrical shoulder could also be formed in front of the flange 5, as indicated by the dashed line in FIG. 2, with a circumferential portion 13a which could form a guide face in the cylindrical transverse bore 23 of the parting blade 20 independently of the flange 5 and its circumferential face 13b.

However, the bore 4 together with the openings 2 and 3 could also be replaced by a groove extending from the rim of the end side 12 in the direction of the centre of the stopper 10. In FIG. 2 this would correspond to the elimination of the hatched part of the flange 5 at the top on the right (underneath the reference number 12), so that the bore 4 would be replaced by a groove which apart from the bore 4 would also comprise this flanged rim region of the stopper 10 shown hatched in FIG. 2. However, with a bore 4 and a completely surrounding circumferential flange 5 the stopper is stronger and less susceptible to damage.

Figure 3:
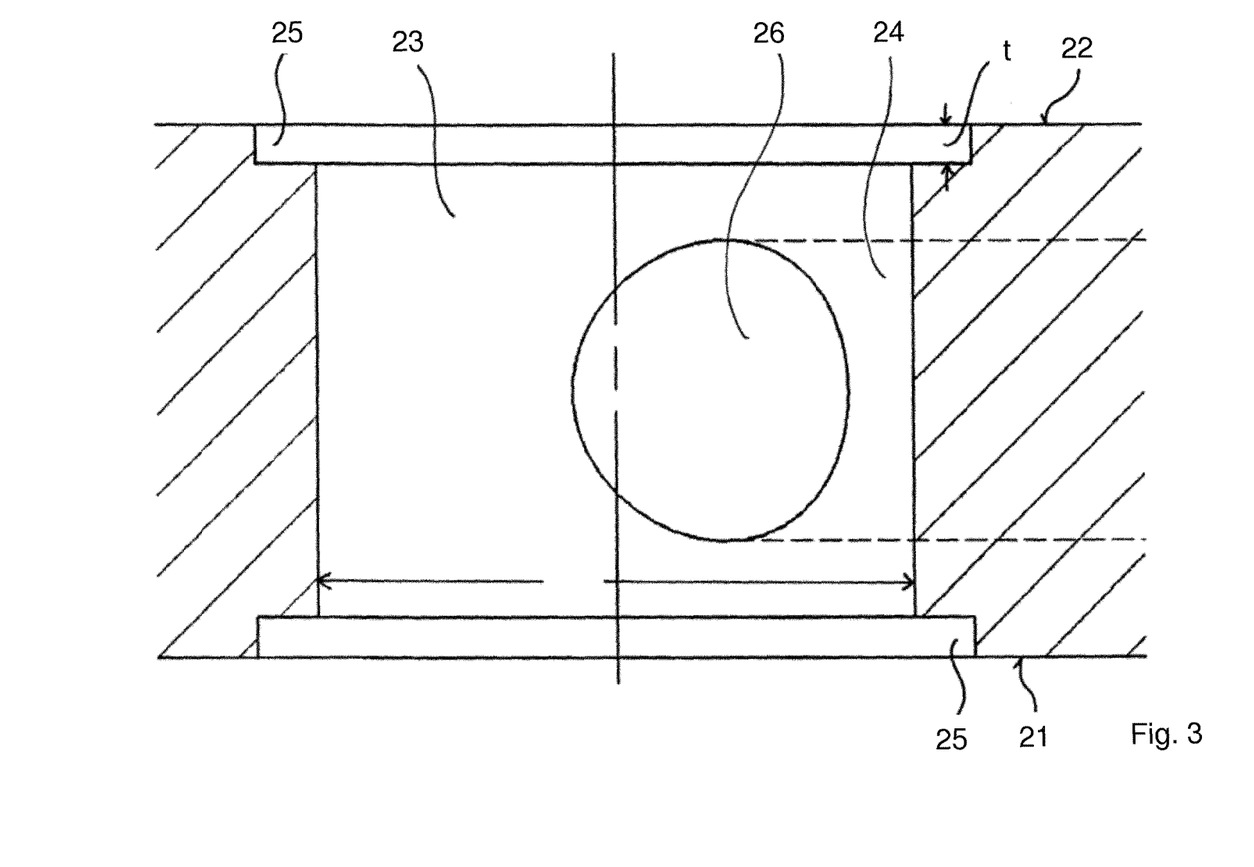
FIG. 3 shows a partly sectional view through the parting blade in the region of a transverse bore.

FIG. 3 shows that the transverse bore 23 is provided with the diameter 2R to accommodate the stopper 10 with a more or less tight fit, wherein the axial position of an opening 26 of the coolant channel 24 corresponds to the axial position of the circumferential groove 6 of the stopper and the opening 3 at the bottom of the groove. When the stopper 10 is inserted, the sealing ring 8 bears on the internal wall of the transverse bore and seals the stopper or the region of the groove 6 in relation to the side face 21 and the end side 11 of the stopper. However, a tight fit between the circumferential faces 13, 13a of the stopper 10 and the internal face of the transverse bore 23 is not absolutely essential as long as at least the sealing ring 8 and the flanged rim 5 ensure centering of the stopper 10 in the transverse bore 23. However, for reliable and precise seating of the stopper 10 it is expedient when at least one of the faces 13a or 13b is guided snugly in the transverse bore 23 or in the widened portion 25 thereof.

The thickness of the flange 5 corresponds to the depth 1 of the widened bore portion 25 of the transverse bore 23, and the thickness of the stopper 10, measured between the end faces 11, 12, corresponds to the thickness of the parting blade 20, so that after insertion in the transverse bore 23 the stopper 10 fits with its end sides 11, 12 flush with the corresponding side faces 21 and 22 respectively of the parting blade 20. With this, there is a fluid connection through the bore 4 from the end side opening 2 of the stopper 10 to the circumferential opening 3, the groove 6 and the opening 26 of the coolant channel 24. The stopper does not protrude from the side faces 21, 22 in any direction and in particular does not obstruct any stream of cuttings and also does not prevent guidance of the parting blade in close proximity past a workpiece. When the clamping block is released slightly, the parting blade 20 can be moved on the side face 22 unhindered in the longitudinal direction, i.e. parallel to the side faces 21, 22.

In the present exemplary embodiment, the transverse bore 23 can be embodied symmetrically with respect to a longitudinal median plane through the parting blade parallel to the two side faces, i.e. a widened portion 25 is visible at both ends of the transverse bore 23 for receiving the flanged rim 5 of the stopper 10. The circumferential seal groove 7 in the stopper 10 for receiving the sealing ring 8 is offset far enough inwards from the end side 11 or 12 of the stopper 10 so that in each case the seal 8 seals in the central portion of the transverse bore 23 which has the smaller diameter 2R. As a result of this, the stopper 10 can be inserted optionally from either side 21 or 22 of the parting blade, and then a circumferential groove is formed in the side face 21 on one side between the circumferential face 13 on one end side 11 of the stopper 10 and the circumferential rim face of the widening 25 (see FIG. 5). However, one of the two widenings 25 could also be eliminated so that then the stopper could be inserted into the transverse bore 23 solely from the side (e.g. 22) with the widening 25.

FIG. 4 again shows a perspective illustration of the stopper 10 with the end sides 11 (not visible) and 12, the openings 2, 3, the bore 4 connecting the openings, the circumferential groove 6 and the sealing ring 8 accommodated in a seal groove 7.

Figure 4:
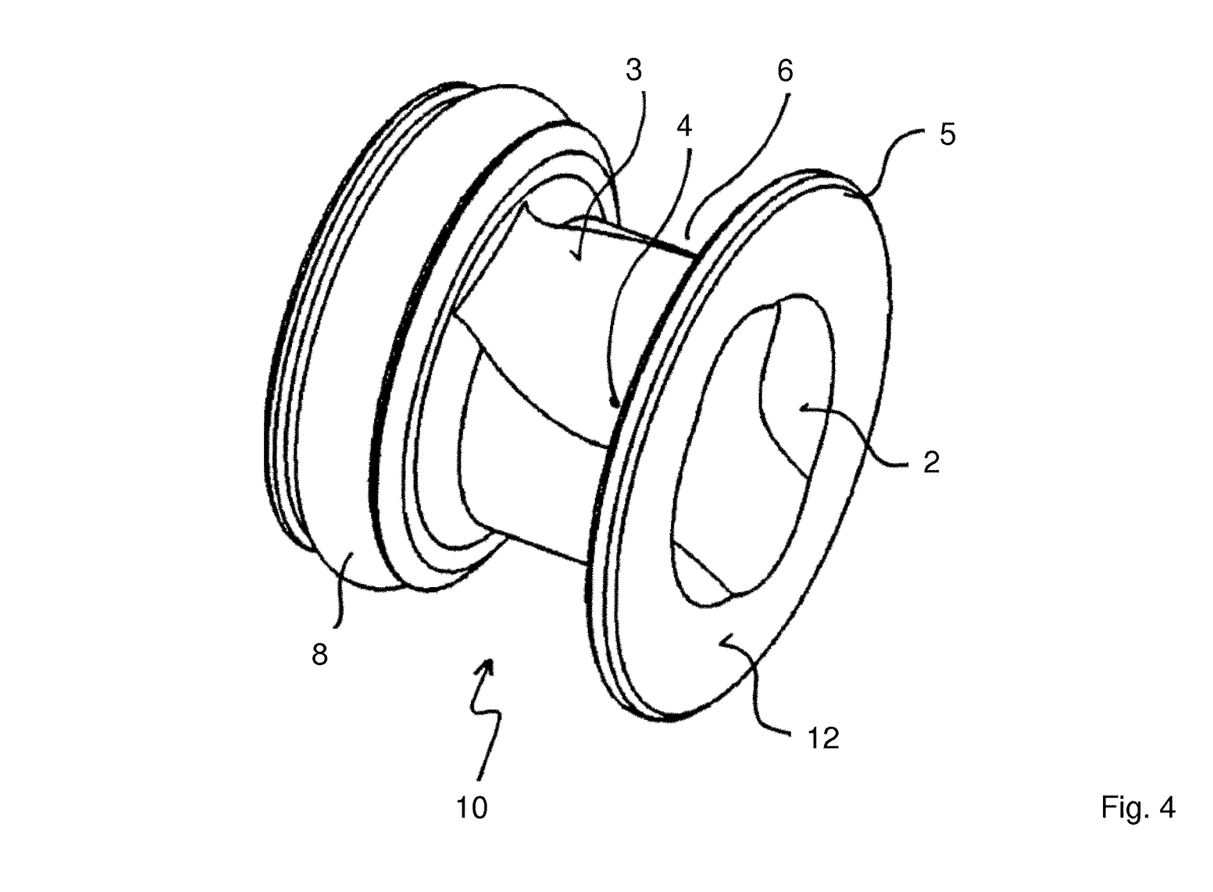
FIG. 4 shows a perspective illustration of the stopper.

Here, it is not necessary for the circumferential face 13 or the portions 13a of the circumferential face 13 to come into contact with the internal face of the bore 23 since the exact positioning of the stopper 10 in the bore 23 is assured solely by the O-ring seal 8 at one end and the cylindrical surface 13b of the flanged rim 5 in the widened portion 25 of the bore.

FIG. 5 again shows in a partial section through the parting blade 20 mounted in the parting blade holder 50 the fluid connection and the sealing of all the elements of a parting off tool according to the invention. The parting blade 20 is pressed firmly by its side face 22 against the bearing face 32 of the parting blade holder 50 by the clamping face 34 and a corresponding roof-shaped face 28 at the edge face 38 of the parting blade. Thus, the side face 22 bears on the bearing face, sealed with the sealing ring 35 in the groove 34, which surrounds the delivery opening 31 completely. The stopper 10 lies with its opening 2 exactly opposite the opening 31 of the coolant chamber 33, with the flanged rim 5 preferably having a greater diameter than the diameter of the delivery opening 31 measured in the vertical direction so that the flanged rim 5 of the stopper is also pressed firmly into the transverse bore 23 by the bearing face 32 and aligned flush with the side face 32. As a result, the flanged rim 5 lies on the bottom of the widened portion 25 of the bore and the opposite end side 11 of the stopper also terminates flush with the side face 21 of the parting blade like the end side 12 with the side face 22. However, it is understood that the flanged rim 5 still lies completely inside the face surrounded by the sealing ring 35.

Figure 5:
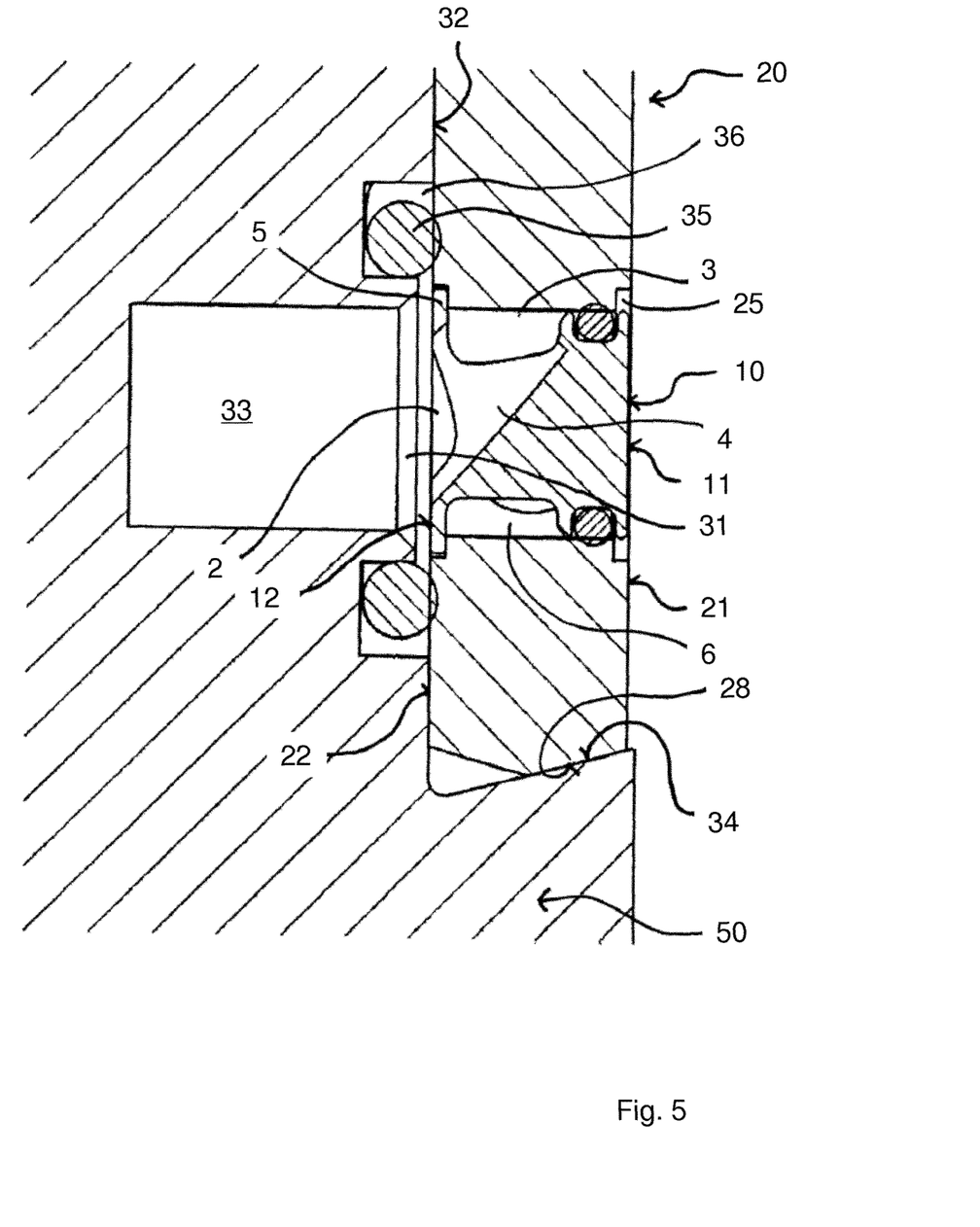
FIG. 5 shows a section through a grooving and parting off tool with a parting blade clamped in it and with the stopper according to the invention for delivery of the coolant.

The pressurised coolant in the coolant chamber 33 passes through the bore 4 of the stopper 10 into the circumferential groove 6 and from there into the coolant channel 24 of the parting blade and is guided from there via the coolant channel 24 to a cutting insert so that a corresponding jet of coolant is aimed at the region of the cutting edge of a cutting insert.

In order to safely avoid the stopper or the flanged rim 5 and its end face 12 protruding in relation to the side face 22 even when there are differences in tolerance, the thickness of the flanged rim 5 can be chosen thinner than the depth of the widened portion 25 of the bore by the maximum difference in tolerance. The pressure of the coolant in the bore 4 ensures in any case that the flanged rim 5 is pressed firmly against the bottom of the widened portion of the bore, and the measurement between the flanged rim and the end side 11 is chosen so that in this position the end side 11 terminates flush with the side 31 or is arranged so as to be recessed a tiny amount.

The circumferential sealing ring 35 ensures that outside the delivery opening 36 no coolant whatsoever can get between the side face 22 of the parting blade and the bearing face 32 of the parting blade holder.

The fitting of the stopper simply by inserting it into the transverse bore 23 is much easier than the conventional sealing of the bore 23 from the side face 21 as was the usual practice in the prior art, and in addition any protrusion in the region of the sealing of the transverse bore 23 on the side face 21 is avoided so that no cuttings can be trapped in this region and there is nothing to prevent the parting blade being guided past a portion of a workpiece in close proximity to it.

For the purposes of the original disclosure, it is pointed out that all features as revealed to a specialist in the art from the present description, the drawings and the dependent claims, even when only described in concrete terms in connection with particular further features, can be combined both individually and also in any combinations with others of the features or groups of features disclosed here, provided this has not been expressly excluded or technical conditions make such combinations impossible or senseless. Exhaustive explicit illustration of all conceivable combinations of features and the stressing of the independence of the individual features of one another is only omitted here for the sake of brevity and readability of the description.

The invention claimed is:

1. A parting blade with an internal coolant supply, the parting blade comprising:
   two substantially plane parallel side faces and one continuous transverse bore, which is connected with a coolant channel disposed in an interior of the parting blade parallel to the parallel side faces; and
   a stopper having a first and second substantially parallel end and a circumferential face connecting the ends with each other, wherein the stopper is arranged to be inserted into the transverse bore to seal the transverse bore to at least one side face of the parting blade and terminates at this sealed side face without any protrusion extending beyond the sealed side face, wherein the stopper has, in the first end and the circumferential face, an opening, the openings of the first end and the circumferential face being connected with one another in the interior of the stopper, through which the stopper connects the coolant channel, which is open at a circumference of the transverse bore, with a coolant source opposite the opening of the first end of the stopper, wherein the stopper is shaped as a cylinder, the first end of the cylinder having a radially protruding flanged rim, the opening of the first end being a central opening through the flange.

2. The parting blade according to claim 1, wherein the circumferential face has a circumferential distributor groove, which in any orientation of the stopper with respect to its axis creates a connection between the opening on the circumferential face of the stopper and an opening of the coolant channel in the transverse bore.

3. The parting blade according to claim 1, wherein in the vicinity of the end side to be sealed the circumferential face has a circumferential seal groove for receiving a sealing ring.

4. The parting blade according to claim 1, wherein the openings of the stopper on the first end and the circumferential face are connected by a bore running obliquely in relation to an axis of the stopper.

5. The parting blade according to claim 1, wherein the openings on the first end and the circumferential face of the stopper are connected by a groove which extends obliquely in relation to an axis of the stopper from an edge formed by an intersection of the circumferential face and the first end into the first end and the circumferential face.

6. The parting blade according to claim 1, wherein the transverse bore of the parting blade is a stepped bore having a widened bore portion arranged to receive the flanged rim of the stopper.

7. The parting blade according to claim 1, wherein the transverse bore of the parting blade is symmetrically located with respect to a central plane parallel to and between the side faces of the parting blade.

8. A tool for parting off or grooving, the tool comprising:
   a parting blade having an internal coolant supply, two substantially plane parallel side faces and one continuous transverse bore, which is connected with a coolant channel disposed in an interior of the parting blade parallel to the side faces, and a stopper having a first and second substantially parallel end and a circumferential face connecting the ends with each other, wherein the stopper is arranged to be inserted into the transverse bore to seal the transverse bore to at least one side face of the parting blade and terminates at this sealed side face without any protrusion extending beyond the sealed side face, wherein the stopper has, in the first end and the circumferential face, an opening, the openings of the first end and the circumferential face being connected with one another in the interior of the stopper, through which the stopper connects the coolant channel, which is open at a circumference of the transverse bore, with a coolant source opposite the opening of the first end of the stopper, wherein the stopper is shaped as a cylinder, the first end of the cylinder having a radially protruding flanged rim, the opening of the first end being a central opening through the flange; and
   a parting blade holder which has a flat side bearing face for the bearing of a side face of the parting blade and at least one clamping face, which is angled in relation to the bearing face for engagement with an edge face of the parting blade, wherein the bearing face has a delivery opening, which when the parting blade is fitted lies opposite the first end opening of the stopper.

9. The tool according to claim 8, wherein a groove is provided in the bearing face, which surrounds the delivery opening and is arranged to receive a sealing ring.

* * * * *